United States Patent [19]
Sultan

[11] 3,988,745
[45] Oct. 26, 1976

[54] PRINTING INK SUPPLY DEVICE FOR INK JET PRINTER

[75] Inventor: Stig Bertil Sultan, Floda, Sweden

[73] Assignee: Aktiebolaget Original-Odhner, Goteborg, Sweden

[22] Filed: Feb. 24, 1975

[21] Appl. No.: 552,418

Related U.S. Application Data

[63] Continuation of Ser. No. 403,941, Oct. 5, 1973, abandoned.

[52] U.S. Cl. 346/140 R; 346/75
[51] Int. Cl.[2] G01D 15/18
[58] Field of Search 346/140, 75; 137/833; 417/322; 310/8.6, 8.3, 8.2

[56] References Cited

UNITED STATES PATENTS 3,107,630 10/1963 Johnson et al. 417/322
3,495,604 2/1970 Trask 137/833 X
3,654,947 4/1972 Hatch et al. 137/833
3,747,120 7/1973 Stemme 346/140 X
3,832,579 8/1974 Arndt 346/140 X

*Primary Examiner*—Joseph W. Hartary
*Attorney, Agent, or Firm*—Alfred E. Miller

[57] ABSTRACT

An arrangement for supplying liquid, such as ink, from at least one pump chamber to at least one outlet channel. The arrangement has at least two opposite plates in which one plate is provided with pumping means disposed in holes, while the other plate has grooves at the surface thereof facing said one plate. The arrangement is inexpensive to manufacture and simple to assemble, yet functions in a reliable manner.

8 Claims, 17 Drawing Figures

Fig.1
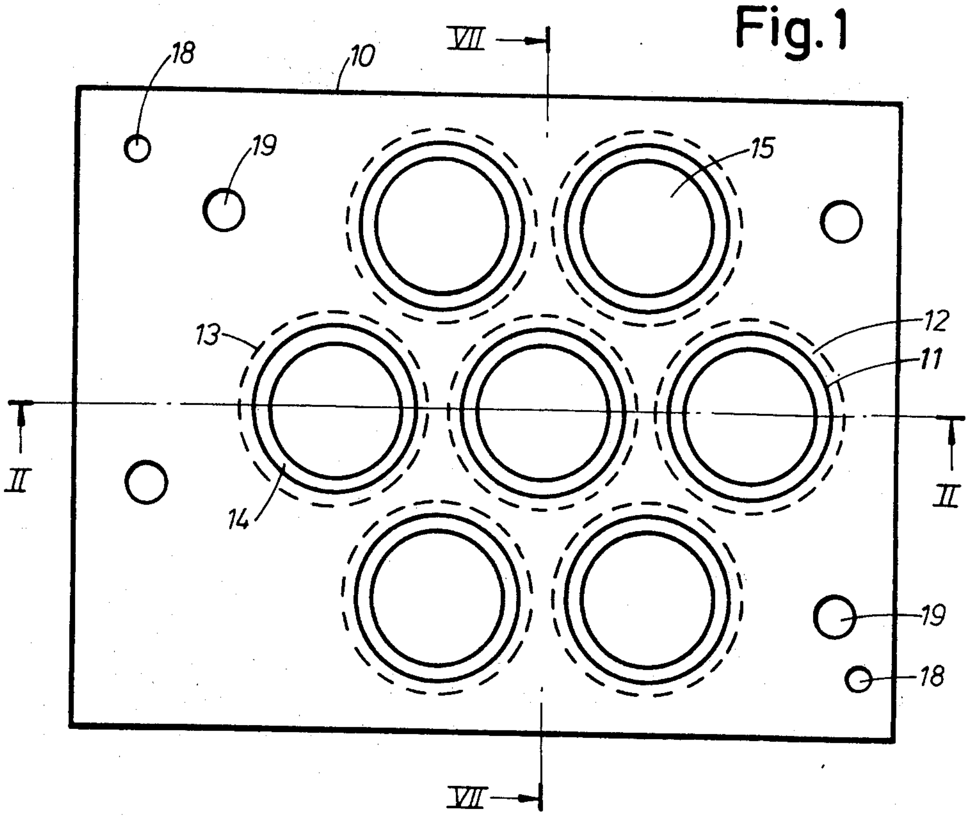
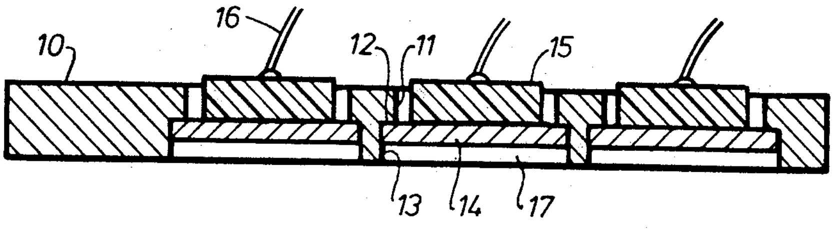
Fig.2

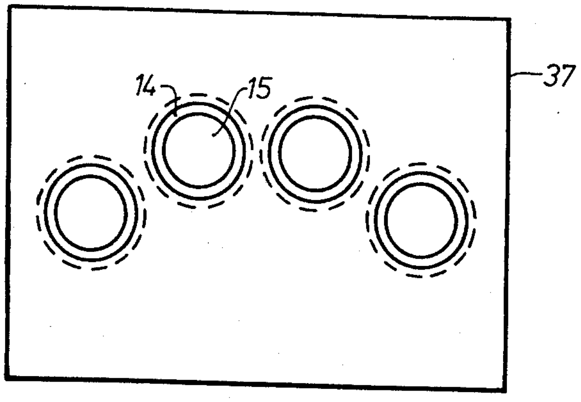
Fig. 11
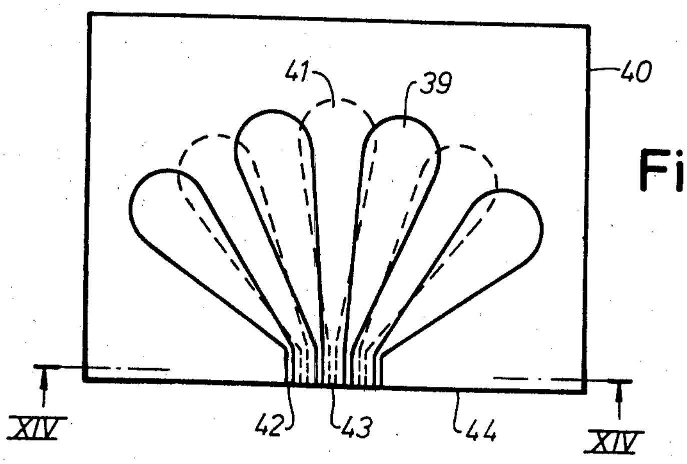
Fig. 13
Fig. 14
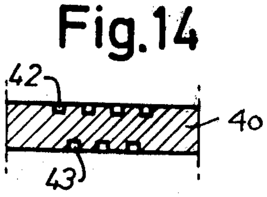
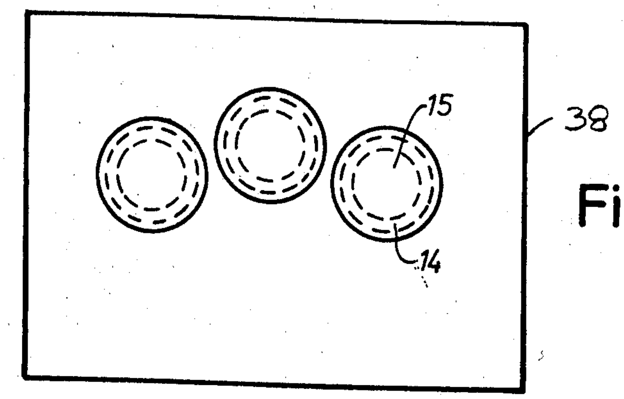
Fig. 12
Fig. 15
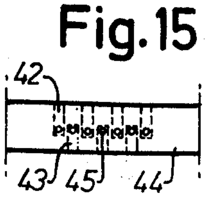

Fig. 16
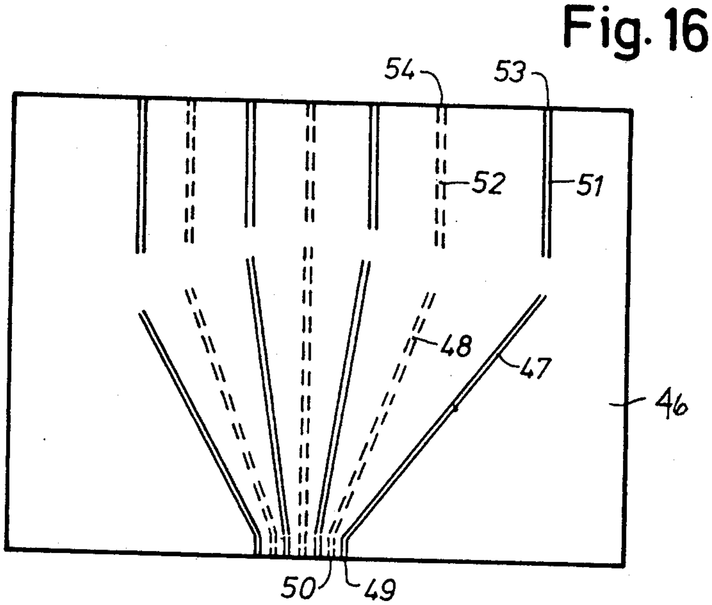
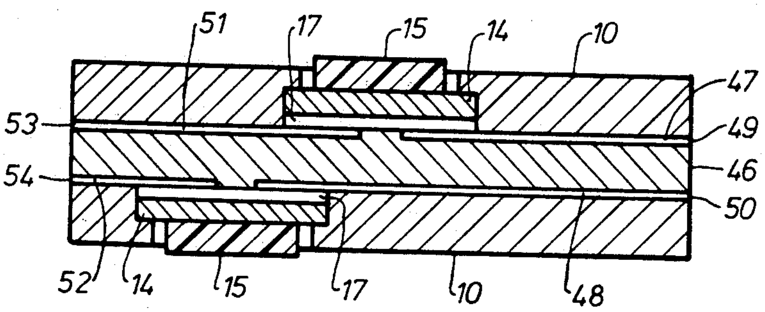
Fig. 17

PRINTING INK SUPPLY DEVICE FOR INK JET PRINTER

CROSS-REFERENCE TO RELATED APPLICATION

This application is a continuation of Ser. No. 403,941, filed Oct. 5, 1973, now abandoned.

BACKGROUND OF THE INVENTION

There is a known device which supplies liquid, such as ink, in the form of a succession of drops to a printing apparatus, for example a dot-matrix printer. The known device has an outer and inner chamber interconnected through an inner capillary opening. The inner chamber has a wall which is formed by a diaphragm that is moved by means of the oscillations of a piezoelectric crystal. The diaphragm is arranged to curve inwardly toward the inner chamber and cause a pressure increase therein. Fluid, for example ink, from the inner chamber will then be ejected at a substantial velocity through the inner capillary and then into the outer chamber. The latter contains a thin liquid layer communicating with an ink reservoir. A thin wall represents the outer wall of the outer chamber against the medium on which the print is to be applied. The thin wall is provided with an outlet capillary located opposite to the inner capillary. In this arrangement, a liquid plug is ejected from the inner capillary which strikes the outlet capillary expelling the liquid therein in the form of a liquid drop. This release of the printing ink liquid in the form of drops continues until the voltage on the piezoelectric crystal is removed and the diaphragm returns to a normal position. A negative pressure is then created in the inner chamber which is transferred to the outer chamber by means of the inner capillary. The pressure is equalized by means of liquid being drawn in from a reservoir communicating with the outer liquid layer or by the liquid column in the outlet capillary being drawn back against the action of the capillary force. Since the resistance of the liquid layer in the outer chamber is considerably smaller than the resistance emanating from the capillary force, the liquid required to equalize the pressure will flow from the aforesaid liquid layer. Thus, the known device operates like a pump by drawing liquid in from the outer chamber and forcing the liquid out through the outlet capillary.

It should be pointed out that the prior art device has a number of disadvantages. For example, the closed inner chamber can be filled with liquid only by drawing a large vacuum on the entire system which causes a liquid reservoir of atmospheric pressure to be connected to said inner chamber. Inasmuch as it is not possible to achieve an absolute vacuum, a certain quantity of air in the form of an air cushion will remain in the inner chamber. When the diaphragm is acted upon, this air cushion will be compressed along with the liquid resulting in the reduced efficiency of the device. This occurs because the reduction of volume caused by the movement of the diaphragm is so small that even a small quantity of air causes a reduction of the volume of the air cushion instead of causing such a pressure increase as would have occurred in an incompressible medium. Another disadvantage of the prior art construction is that both the inner and outer chambers of the device are bounded by thin walls which are difficult to stabilize to prevent vibration during pressure changes in the chambers. The wall thickness is determined by the length of the capillaries which is in the order of 0.1 mm. Because of the small length of the capillaries there is a great risk of air being drawn into the system. Furthermore, because the length and width of each capillary as well as the thickness of the outer liquid layer are approximately 0.1 mm, the fabrication of the known device is complicated and expensive. Still another disadvantage of the known device is that the holes in the device must be centered absolutely opposite to each other along a straight line. As a result, the manufacturing tolerance requirements are extremely great when boring the holes and the mounting of the front wall of the device.

The present invention relates to an ink printer of the jet type in which liquid from one or more pump chambers is conducted to one or more outlet channels.

It is an object of the present invention to provide an ink printer supply arrangement which is simple and inexpensive to manufacture and assemble.

Another object of the present invention is to provide an ink supply and pumping arrangement having two opposite plates in which one plate has pumping means disposed in holes or recesses and the second plate has grooves at the surface thereof which faces the other plate. The pumping chambers are formed by the spaces between the pumping means and the second plate. Furthermore, the spaces communicate with the outlet channels.

The invention will now be more fully described with reference to the accompanying drawings, in which:

FIG. 1 is a top plan view of the plate constituting a crystal holder with mounted crystals and associated diaphragms, constructed in accordance with the teachings of the present invention;

FIG. 2 is a cross sectional view of the crystal holder taken along the lines II—II of FIG. 1;

FIGS. 11 and 12 are top plan views showing two crystal holders in another embodiment of the printing head;

FIG. 13 is a top plan view of a channeled plate;

FIG. 14 is a cross sectional view taken along the lines XIV—XIV of FIG. 13 on a reduced scale;

FIG. 15 shows an alternative embodiment of the printing head shown in FIGS. 11–13 but on a reduced scale;

FIG. 16 is a top plan view of a still further embodiment of the printing head; and FIG. 17 is a cross sectional view of the printing head illustrated in FIG. 16.

DESCRIPTION OF THE PREFERRED EMBODIMENTS

Figure 3:
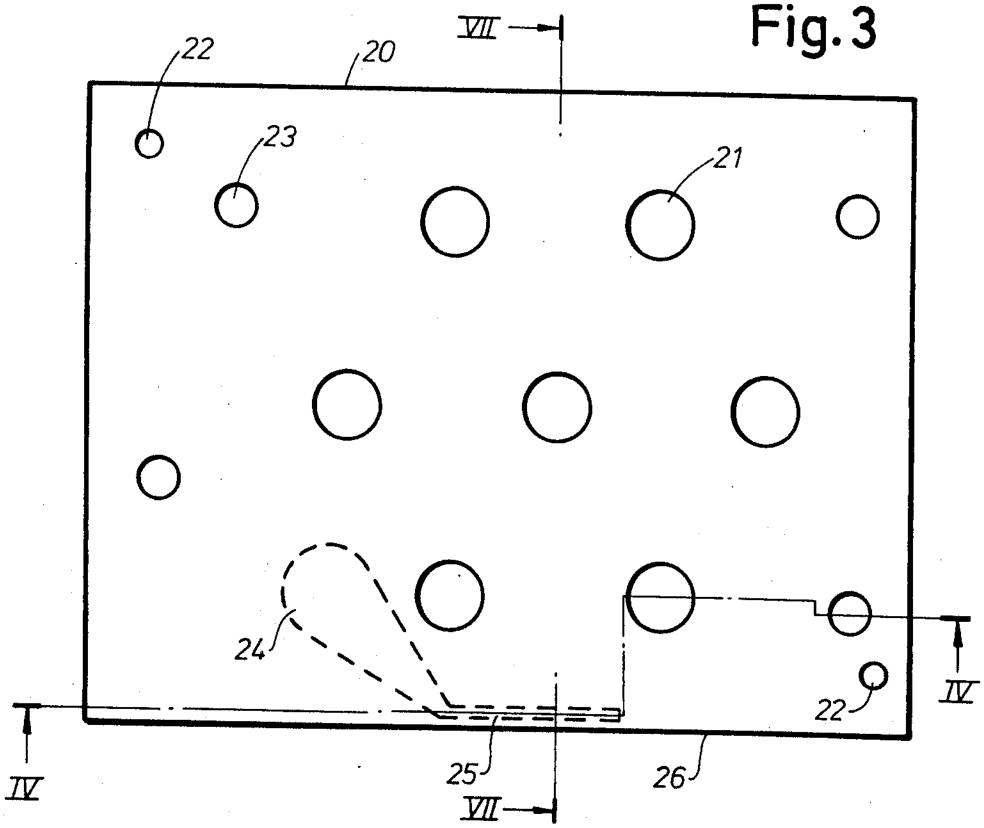
FIG. 3 is a top plan view of an intermediate plate of the present construction.

Referring to FIGS. 1 and 2, a plate 10 is shown which is constituted of nickel, stainless steel, or other suitable material that is generally unaffected by commonly used types of ink and forms part of the printing head. The plate 10 is provided with holes 11 which correspond in number to the number of channels in the printing head. Frequently, seven channels are used by the aid of which characters are formed in a matrix comprising seven by five dots. The holes 11 communicate through annular ledges 12 with corresponding holes 13 of larger diameter. A multiplicity of pumping means having the form of circular diaphragms 14 and preferably fabricated of the same material as the plate 10 are supported on the ledges 12 of the plate 10. The diaphragms are secured to the ledges, for example, by a suitable adhesive or by solder. A piezoelectric crystal 15 is mounted on the upper surface of each diaphragm 14. In the present arrangement, as is known, each crystal 15 is provided with a metallization on opposite flat surfaces forming electrodes to which suitable operating voltages can be connected. The lower electrode is connected to the diaphragm and the upper electrode is electrically connected to a connection conduit 16. Each of the diaphragms 14 is relatively thin so that a gap in a cylindrical shape is formed between the diaphragm and the underside of the plate 10 which functions as a pump chamber 17.

As seen in FIG. 1, the plate 10 is provided with holes 18 for centering of several superposed plates by means of guide pins (not shown). Furthermore, the plate 10 has additional holes 19 for screws or other fastening devices by means of which several superposed plates can be assembled to form a printing head.

Figure 4:
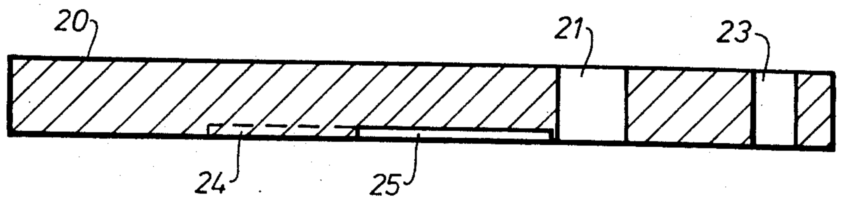
FIG. 4 is a cross sectional view taken along the lines IV—IV of FIG. 3.

Referring to FIGS. 3 and 4, an intermediate plate 20 is shown having spaced through holes 21 that are coaxial with the pump chambers 17, each of which has a considerably smaller diameter than each of the pump chambers. It should also be noted that the plate 20 has through holes 22 and 23 which correspond to the holes 18 and 19 in the plate 10. Furthermore, a shallow groove appears in the under-surface of the plate 20 constituting a widened portion 24 and a narrower portion 25. As seen in FIG. 3, the portion 25 of the shallow groove is close to the edge 26 of the plate 20 and forms a channel through which ink can be conveyed to the capillaries of the printing head.

Figure 5:
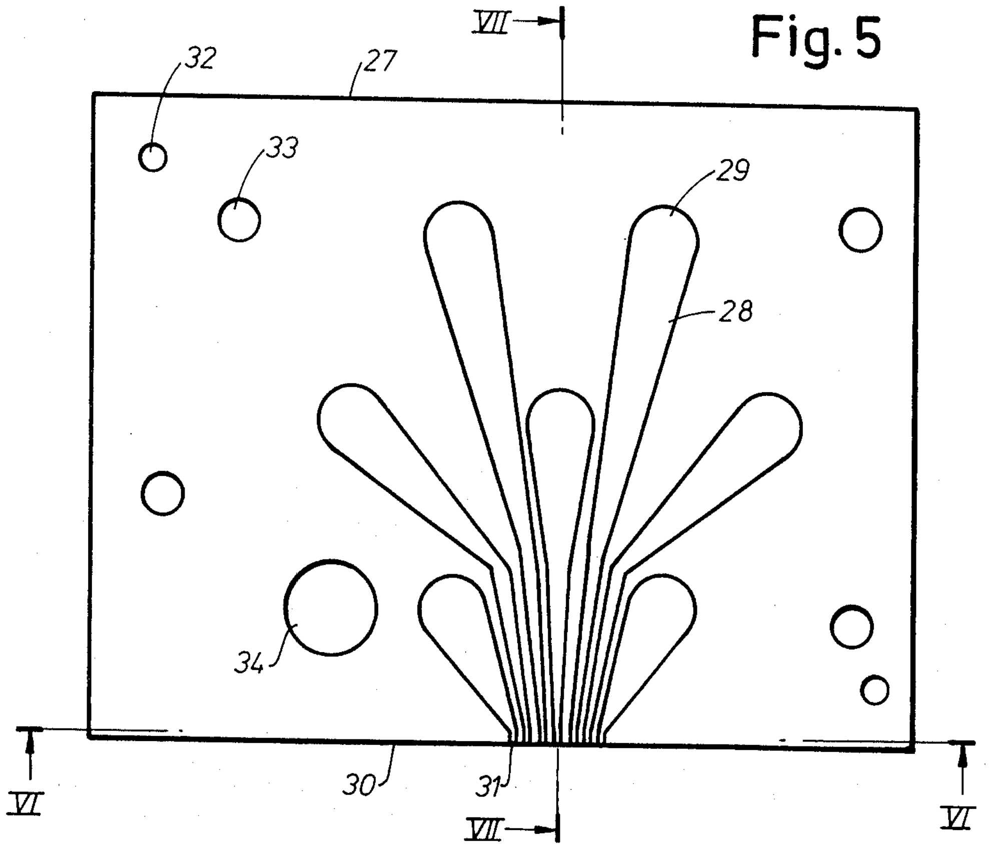
FIG. 5 is a top elevational view of the plate in the present construction provided with channels.
Figure 6:
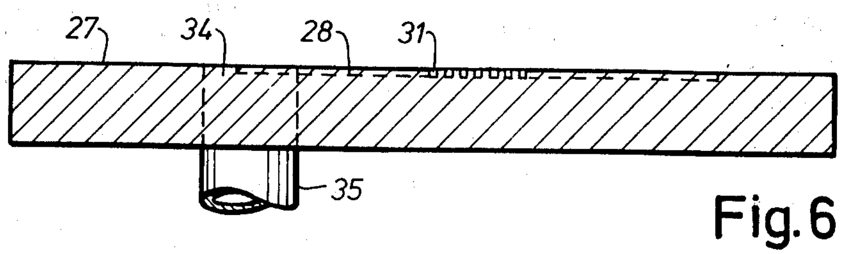
FIG. 6 is a cross sectional view taken along the lines VI—VI of FIG. 5.

A plate 27 is shown in FIGS. 5 and 6 having a plurality of shallow channels 28. Each channel terminates in a circular portion 29 which is generally concentric to the corresponding hole 21 in the intermediate plate 20. The channels 28 are shown to narrow down from the circular portions 29 to the edge 30 of plate 27 in which they open into the capillary nozzles 31. The length of each of these nozzles is preferably about 0.5 mm and the cross sections thereof are approximately 0.01 $mm^2$. These dimensions, however, can be varied to suit the requirement of each particular construction. In addition, the capillaries may be either rectangular or circular in cross section.

As seen in FIG. 5, the plate 27 is provided with holes 32 and 33 corresponding to the holes 18 and 19 in the plate 10. Furthermore, a hole 34 communicates with an ink supply tube 35 (FIG. 6) which corresponds to the grooved portion 24 of the plate 20.

The intermediate plate 20 and/or the plate 27 having channels may be moulded of a suitable plastic or other material whereby grooves are made in the plastic to form required channels when the printing head is assembled. These grooves may be formed by etching or by stamping the plates. The capillaries also can be made either by the above-mentioned methods or may be bored when the head is in the assembled condition. If the capillaries are fabricated by boring the plate, the channels 28 must terminate, for instance 0.5 mm from the edge 30. Then the capillaries are bored from the edge 30 to the channels. The boring accuracy is not of great importance if the channels 28 are made deeper and wider than the capillaries.

Figure 7:
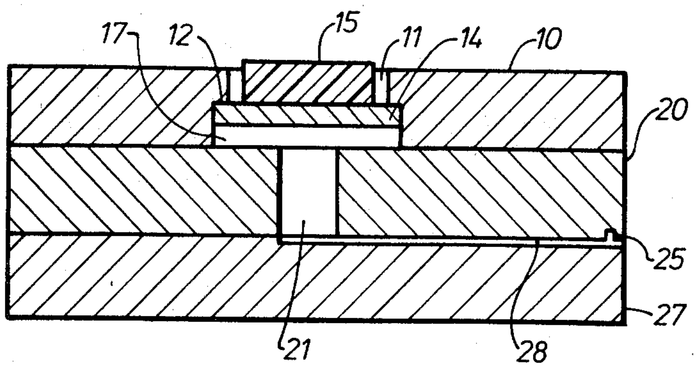
FIG. 7 is a sectional view of the assembled printing head of the invention showing certain details of construction illustrated in FIGS. 1–6.

Referring now to FIG. 7, a printing head is shown in cross sectional view having the details of construction illustrated in FIGS. 1–6. The precise relative position of of the superposed plates 10, 20, and 27 is determined by the aligned guiding holes 18, 22, and 32. These holes are provided with guiding pins (not shown) which accurately fit therein. The plates 10, 20, and 27 are assembled in a fixed relationship by means of screws (not shown) passing through aligned holes 19, 23, and 33. The abutting surfaces of the plates are so accurately planed that generally no special seal is required therebetween.

When the present printing head is used, all the channels in the device must be filled with ink. Therefore, the parts of the device can be assembled beneath the surface of a suitable liquid, such as glycerine. The assembly, in this case, can be accomplished under the liquid surface by tightening screws, and adsorbed air can be removed, for instance, by ultrasonic techniques.

When the printing head of the present invention is put into use, it is connected to an ink reservoir that is located in a plane lower than the nozzles 31 (FIG. 6). However, the nozzles will have printing liquid therein at all times because of the capillary force therein, which also acts to prevent the "bleeding" of the capillaries.

Figure 8:
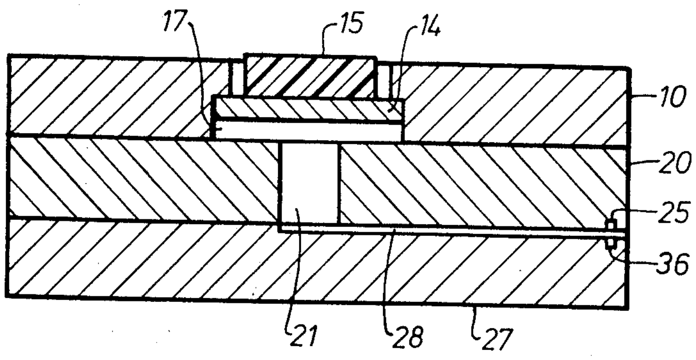
FIG. 8 is a cross sectional view of a printing head similar to that shown in FIG. 7 in which the plate with the channels is provided with an ink supply channel.

FIG. 8 shows an alternate construction of the present invention in which the plate 27 having the channels 28 is provided with an additional channel 36 that is located opposite to the channel 25 in abutting intermediate plate 20. This construction improves the liquid ink supply and the risk of air being drawn through the nozzles 31 is considerably reduced.

Figure 9:
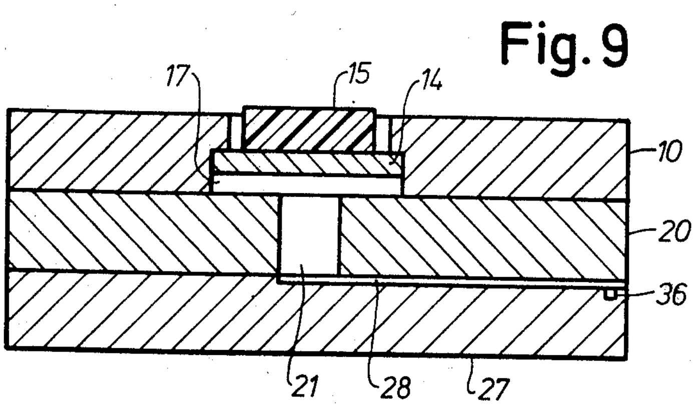
FIG. 9 is a cross sectional view of a printing head similar to that shown in FIG. 7 but in which the channeled plate is provided with an ink supply.
Figure 10:
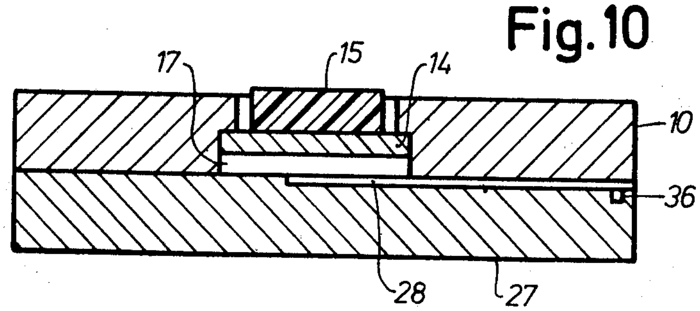
FIG. 10 is another embodiment showing a cross sectional view of the printing head.

In FIG. 9, the ink supply channels 28 and 36 are shown to be solely in the plate 27. This construction permits the elimination of the intermediate plate 20, as is seen in FIG. 10. It should be noted that there are no holes 21, as seen in FIGS. 3 and 4, in the present construction and therefore, the entire diaphragm 14 will act on the corresponding part of the channels in the plate 27. Further in connection with FIG. 10, the piezoelectric crystals 15 are spaced apart more than the spacing illustrated in FIG. 1 in order to prevent the diaphragm from acting on an adjacent channel. Thus, the planar plate surface is larger and the channels are made longer.

Referring to FIGS. 11–14, another embodiment is shown in which the piezoelectric crystals 15 are mounted on two separate plates 37 and 38. In a printing head having seven channels, the plate 37 has four piezoelectric crystals 15, while the plate 38 has three crystals, all with associated diaphragms 14. The diaphragms on the plate 37 co-act with channels 39 in the channeled plate 40 shown in FIG. 13. It will be noted that the channels 39 are spaced apart a relatively large distance, thereby avoiding the possibility of one channel being acted upon affecting an adjacent channel. The diaphragms 14 on the plate 38 co-act in the same manner with channels 41 on the other side of channeled plate 40, as seen in FIG. 13.

FIG. 14 discloses the capillary nozzles 42 and 43 located on opposite sides of the channeled plate 40 in a staggered relationship. If the nozzles are positioned in a zig-zag pattern, they can be placed such that their projections on a longitudinal line will lie closer than can be achieved with a single row of nozzles. The capillaries shown in FIG. 14 may be so placed that all the nozzles are situated on a straight line. In the use of an ink jet printer where the printing head is moved along a line for printing purposes, the pulses delivered to the piezoelectric crystals can be retarded to certain crystals in order to compensate for the displacement of the printing head. FIG. 15 shows a construction in which the channels are made deeper than half the thickness of the channeled plate, at least near the marginal edge 44 of the plate 40. However, the channels must not abut the edge 44, but there must be a wall of suitable thickness between the end of the channels and the adjacent edge 44. As seen in FIG. 15, holes 45 are bored through the walls to the channels, and all of the holes may be located in a relatively straight line.

It will be noted that FIG. 13 does not show a channel corresponding to the channel 36 illustrated in FIGS. 8 and 10. However, in a printing head constructed in accordance with the teachings of the present invention, ink can be transported to the capillaries in a manner as illustrated in FIGS. 16 and 17. As seen in FIGS. 16 and 17, a channeled plate 46 is provided with channels 47 in one surface and channels 48 in the opposite surface of the plate 46. The channels open into respective capillary nozzles 49 and 50. The plate 46 also has ink supply channels 51 and 52 which is supplied with ink at inlets 53 and 54, respectively.

Referring again to FIG. 16, the channels 47 and 48 are illustrated as straight narrow grooves, but the channels may be constructed as shown in FIG. 13. The location of the crystals 15 and the diaphragms 14, as well as the other details of construction, may correspond to what is shown in FIGS. 11–15. FIG. 17 shows as assembled printing head in which the pumping means comprises a crystal 15 and a diaphragm 14 in each of the plates 10. As seen in FIG. 17, the channels 47 and 48 communicate with the channels 51 and 52, respectively, through the cylindrical gaps forming the pump chambers 17.

What is claimed is:

1. A printing ink supply device for ink jet printers comprising: at least two plates located opposite to each other and interconnected, said first plate being provided with a recess having pumping means therein, said pumping means constituting a piezoelectric crystal and an operatively connected diaphragm, a pump chamber for said pumping means being constituted of a space formed between the pumping means and the second plate, a channel formed in said second plate by means of an elongated shallow groove in a surface facing said first plate together with an adjacent surface of said first plate, a capillary nozzle in one edge of said second plate, said space communicating with said capillary nozzle by means of said channel.

2. A printing ink supply device as claimed in claim 1, wherein said supply channel is provided with an enlarged portion and a narrower portion, the latter portion being connected to said capillary nozzle.

3. A printing ink supply device for ink jet printers comprising: first and second plates and an intermediate plate therebetween, the first plate being provided with at least one recess, pumping means in said recess, said second plate having at least one shallow groove in the surface thereof facing said first plate which forms a channel with a surface of said intermediate plate, said pumping means constituting piezoelectric crystal and an operatively connected diaphragm, a pump chamber for said pumping means being constituted by a space formed between the pumping means and the adjacent surface of said intermediate plate and a connecting hole through said intermediate plate having a smaller cross-sectional area than the cross-sectional area of said pump chamber, said channel in said second plate being in communication with said hole, and a capillary nozzle in one edge of said second plate, said channel being connected to the capillary nozzle through which ink is supplied to said jet printer.

4. A printing ink supply device as claimed in claim 3, wherein said intermediate plate is provided with an additional shallow ink channel facing said second plate and disposed opposite to said channel in said second plate.

5. A printing ink supply device as claimed in claim 4, wherein opposite surfaces of said intermediate plate are provided with ink channels, and said second plate is provided with pumping means co-acting with an adjacent ink channel.

6. A printing ink supply device as claimed in claim 5, wherein said channels communicate with respective capillary nozzles that are located in two rows so that the openings of the nozzles form a zig-zag pattern.

7. A printing ink supply device as claimed in claim 4, wherein the supply channels on opposite surfaces of said intermediate plate are connected with the inner ends of respective capillary nozzles, said channels being so located and directed that their openings form a single row of holes.

8. A printing ink supply device as claimed in claim 7, wherein each of said supply channels at least adjacent to a corresponding capillary nozzle has a depth of more than half the thickness of said intermediate plate, and said capillary nozzles are positioned in a generally parallel relationship.

* * * * *